(12) United States Patent
Barton et al.

(10) Patent No.: US 10,848,202 B2
(45) Date of Patent: Nov. 24, 2020

(54) TELEPROTECTION REQUIREMENT COMPLIANCE

(71) Applicant: Cisco Technology, Inc., San Jose, CA (US)

(72) Inventors: Robert Barton, Richmond (CA); Maik Guenter Seewald, Nuremberg (DE); Michael Alan Kowal, Summit, NJ (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 536 days.

(21) Appl. No.: 15/650,359

(22) Filed: Jul. 14, 2017

(65) Prior Publication Data

US 2019/0020372 A1    Jan. 17, 2019

(51) Int. Cl.
  *H04B 3/54*      (2006.01)
  *G06F 11/20*     (2006.01)
  *H04B 7/14*      (2006.01)
  *H04L 12/841*    (2013.01)

(52) U.S. Cl.
  CPC ......... *H04B 3/546* (2013.01); *G06F 11/2025* (2013.01); *G06F 11/2069* (2013.01); *H04B 7/14* (2013.01); *H04L 47/283* (2013.01)

(58) Field of Classification Search
  USPC .................................................... 361/62–69
  See application file for complete search history.

(56) References Cited

U.S. PATENT DOCUMENTS

| | | |
|---|---|---|
| 2011/0090802 A1 | 4/2011 | Kotrla et al. |
| 2012/0075999 A1 | 3/2012 | Ko et al. |
| 2013/0054784 A1* | 2/2013 | Yadav ............... H04L 43/18 709/224 |
| 2015/0146536 A1* | 5/2015 | Minei ............... H04L 45/507 370/236 |
| 2016/0373274 A1 | 12/2016 | Sivanthi et al. |
| 2017/0034043 A1* | 2/2017 | Tochio ............ H04L 43/0823 |
| 2019/0058657 A1* | 2/2019 | Chunduri ......... H04L 45/12 |

OTHER PUBLICATIONS

N. C. Seeley, "Automation at Protection Speeds: IEC 61850 GOOSE Messaging as a Reliable, High-Speed Alternative to Serial Communications", 10th Annual Western Power Delivery Automation Conference, Spokane, Washington, Apr. 8-10, 2008, 7 pages.
C. Kriger, et al., "A Detailed Analysis of the GOOSE Message Structure in an IEC 61850 Standard-Based Substation Automation System", International Journal of Computers Communications & Control, vol. 8, No. 5, Oct. 2013, ISSN 1841-9836, 14 pages.
"Cisco Performance Routing", Data Sheet, www.cisco.com, C78-424310-02, Jul. 2010, 10 pages.
(Continued)

*Primary Examiner* — Danny Nguyen
(74) *Attorney, Agent, or Firm* — Edell, Shapiro & Finnan, LLC (57) ABSTRACT

A methodology includes determining a first delay between a first relay and a first label edge router, a second delay between a second relay and a second label edge router, and a third delay of a label-switched path between the first label edge router and the second label edge router. Based on the first, second, and third delays, it is determined whether an end-to-end latency between the first relay and the second relay exceeds an end-to-end latency threshold.

20 Claims, 5 Drawing Sheets

(56) References Cited

OTHER PUBLICATIONS

X. Fu, et al., "RSVP-TE extensions for Loss and Delay Traffic Engineering", draft-fuxh-mpls-delay-loss-rsvp-te-ext-02, Network Working Group, Internet-Draft, Oct. 22, 2012, 16 pages.
I. Busi, et al., "MPLS-TP OAM based on Y.1731", draft-bhh-mpls-tp-oam-y1731-08.txt, MPLS Working Group, Internet Draft, Jan. 11, 2012, 29 pages.
Dr. Steven Blair, et al., "Real-Time Teleprotection Testing using IP/MPLS over xDSL", May 2013, STRATH/AL/DSL/001, University of Strathclyde Engineering, 18 pages.
"Deploying IP/MPLS Communications Networks for Smart Grids", Alcatel-Lucent Application Note, www.alcatel-lucent.com, M2012104781, Nov. 2012, 20 pages.
H. Ito, et al., "IEC GOOSE 61850", Toshiba Corporation, Japan, Pac.Winter .2008, 7 pages.
E. Atienza, "Testing and Troubleshooting IEC 61850 GOOSE-Based Control and Protection Schemes", Schweitzer Engineering Laboratories, Inc., 12th Annual Western Power Delivery Automation Conference, Spokane, Washington, Apr. 13-15, 2010, 8 pages.
"IEEE Standard for a Precision Clock Synchronization Protocol for Networked Measurement and Control Systems", IEEE Instrumentation and Measurement Society, Jul. 24, 2008, IEEE Std 1588™ -2008 (Revision of IEEE Std. 1588-2002), pp. 1-100.
"IEEE Standard for a Precision Clock Synchronization Protocol for Networked Measurement and Control Systems", IEEE Instrumentation and Measurement Society, Jul. 24, 2008, IEEE Std. 1588™ -2008 (Revision of IEEE Std. 1588-2002), pp. 101-200.
"IEEE Standard for a Precision Clock Synchronization Protocol for Networked Measurement and Control Systems", IEEE Instrumentation and Measurement Society, Jul. 24, 2008, IEEE Std. 1588™ -2008 (Revision of IEEE Std. 1588-2002), pp. 201-289.
"Communication networks and systems in substations", Part 8-1: Specific Communication Service Mapping (SCSM)—Mappings to MMS (ISO 9560-1 and ISO 9506-2) and to ISO/IEC 8802-3, IEC 61850-8-1, First edition May 2004, International Standard, IEC 61850-8-1:2004(E), pp. 1-100.
"Communication networks and systems in substations", Part 8-1: Specific Communication Service Mapping (SCSM)—Mappings to MMS (ISO 9560-1 and ISO 9506-2) and to ISO/IEC 8802-3, IEC 61850-8-1, First edition May 2004, International Standard, IEC 61850-8-1:2004(E), pp. 101-140.
Siemens, "Line differential protection in context of MPLS-based communication networks", Siemens AG, APN-044, Edition 1, 2016, 14 pages.
Alcatel Lucent, "Mission-critical communications networks for power utilities Enabling reliable transport for teleprotection", Alcatel Lucent, Aug. 2015, 18 pages.
Alcatel Lucent, "Mission-critical communications networks for power utilities Network Transformation with IP/MPLS for Synchrophasor Application", Alcatel Lucent, Nov. 2013, 18 pages.
Li Qin, "PTN Clock Synchronization Technology and Its Applications", ZTE Communications, No. 3, Sep. 13, 2010, 19 pages.

\* cited by examiner

US 10,848,202 B2

TELEPROTECTION REQUIREMENT COMPLIANCE

TECHNICAL FIELD

The present disclosure relates to teleprotection.

BACKGROUND

Utilities provide electricity using transmission power lines running between substations/feeders. Circuit breakers and relays are used to ensure safety and proper transmission of power. Teleprotection systems are often employed to enhance power system reliability. Specifically, teleprotection relays located at substations may measure current differentials between substations, thereby enabling utilities to take proper action. More specifically, synchronous communication between pairs of relays communicate, for example, real-time current measurements to detect faults in a given power line.

DESCRIPTION OF EXAMPLE EMBODIMENTS

Overview

A methodology is described herein including determining a first delay between a first relay and a first label edge router, a second delay between a second relay and a second label edge router, and a third delay of a label-switched path between the first label edge router and the second label edge router. Based on the first, second, and third delays, it is determined whether an end-to-end latency between the first relay and the second relay exceeds an end-to-end latency threshold.

Example Embodiments

Traditionally, teleprotection relays communicated over dedicated serial links, in which latency was controlled and consistent. However, the emerging trend today is to transport teleprotection communications over Multiprotocol Label Switching (MPLS) networks, either by transporting legacy serial connections over Circuit Emulation Service over Packet Switched Network (CESoPSN), or using a native Ethernet pseudowire with native Ethernet-based communications for teleprotection using Generic Object Oriented Substation Event (GOOSE) messages in accordance with International Electrotechnical Commission (IEC) 61850.

Figure 1:
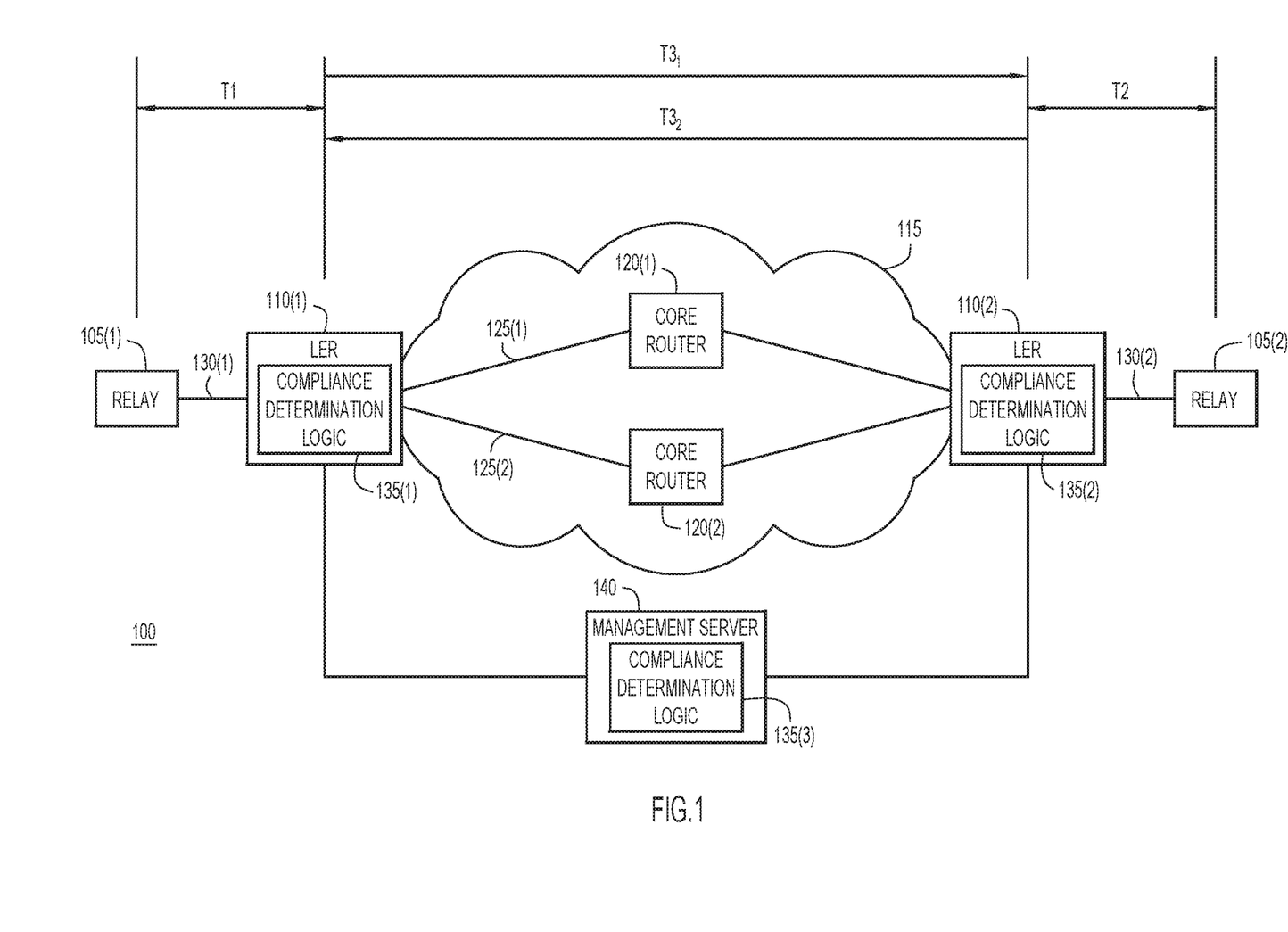
FIG. 1 is an overview diagram of a teleprotection environment, according to an example embodiment.

With reference made to FIG. 1, shown is an example teleprotection environment 100 in accordance with examples presented herein. Teleprotection environment 100 includes first and second relays 105(1), 105(2) (e.g., electrical distribution relays), first and second label edge routers 110(1), 110(2), and an MPLS network 115 to enable communication between the first and second relays 105(1), 105(2). In this example, the MPLS network 115 includes core routers 120(1)-120(2), although it will be understood that an MPLS network may generally include any number of core routers. Label edge router 110(1), core router 120(1), and label edge router 110(2) form a primary label-switched path 125(1) of the MPLS network 115. Label edge router 110(1), core router 120(2), and label edge router 110(2) form a backup label-switched path 125(2) of the MPLS network 115.

Relays 105(1)-105(2) are connected to respective substations of a utility (not shown), which provide electricity via transmission power lines. The relays 105(1), 105(2) take real-time measurements of the respective currents at the respective substations and communicate with each other over a data path (pseudowire). In this example, the relays communicate by default over primary label-switched path 125(1) of the MPLS network 115. For instance, a message from relay 105(1) may flow over first dedicated cable 130(1) to label edge router 110(1), across label-switched path 125(1) to label edge router 110(2), and over a second dedicated cable 130(2) to relay 105(2). Due to fluctuating current measurements, there are stringent industry requirements for the end-to-end latency, bidirectional latency, and jitter of the primary label-switched path 125(1). For example, the maximum acceptable end-to-end latency may be 10 ms, and the maximum acceptable bidirectional latency may be 1 ms.

Conventional teleprotection systems do not take into account end-to-end latency, bidirectional latency, and jitter. Typically, an end-to-end latency budget is a significant design challenge, and after deploying an MPLS network and pseudowires (e.g., with Traffic Engineering (TE), Transport Profile (TP), Flex, etc.), teleprotection engineers are required to use expensive test gear to determine end-to-end latency, bidirectional latency, and jitter to ensure the label-switched path meets the stringent teleprotection requirements. Failure to meet these communication requirements may lead to disastrous results (e.g., power failures) or false responses by the protection devices (e.g., tripping). Furthermore, utilities typically only make these measurements when the MPLS network is first being provisioned, and thereafter cannot ensure the network is continuing to meet the minimum teleprotection requirements while operating. This is a major roadblock to migrating teleprotection systems to packet-based networks in utilities worldwide.

As such, label edge routers 110(1), 110(2) include respective compliance determination logic 135(1), 135(2). Briefly, compliance determination logic 135(1), 135(2) provide awareness to the label edge routers 110(1), 110(2) of the MPLS network 115 by using relay measurements to influence traffic engineering policies. This makes the MPLS network 115 application-aware for critical teleprotection services. The label edge routers 110(1), 110(2) continually monitor end-to-end latency, bidirectional latency, and jitter using data generated by relays 105(1), 105(2), compare the measurements with the corresponding permissible thresholds, and use this information to fail over to backup label-switched path 125(2), when warranted. In one example, the thresholds may be communicated to label edge routers 110(1), 110(2) by a control-channel mechanism. In another example, a network administrator may program the thresholds into the label edge routers 110(1), 110(2).

As used herein, the term "label edge router" may be interchangeable with "compliance determination logic" because the compliance determination logic may reside on the label edge router. However, it will be understood that, in general, at least a portion of compliance determination logic may reside on a device other than a label edge router. For example, teleprotection environment 100 optionally includes a management server 140 in communication with label edge routers 110(1)-110(2). The management server 140 includes compliance determination logic 135(3) to perform the techniques described herein. Compliance determination logic 135(3) may be implemented as an alternative to compliance determination logic 135(1), 135(2). That is, in one example, the techniques described herein may be implemented on the label edge router 110(1) and/or label edge router 110(2), or on the management server 140.

Figure 2:
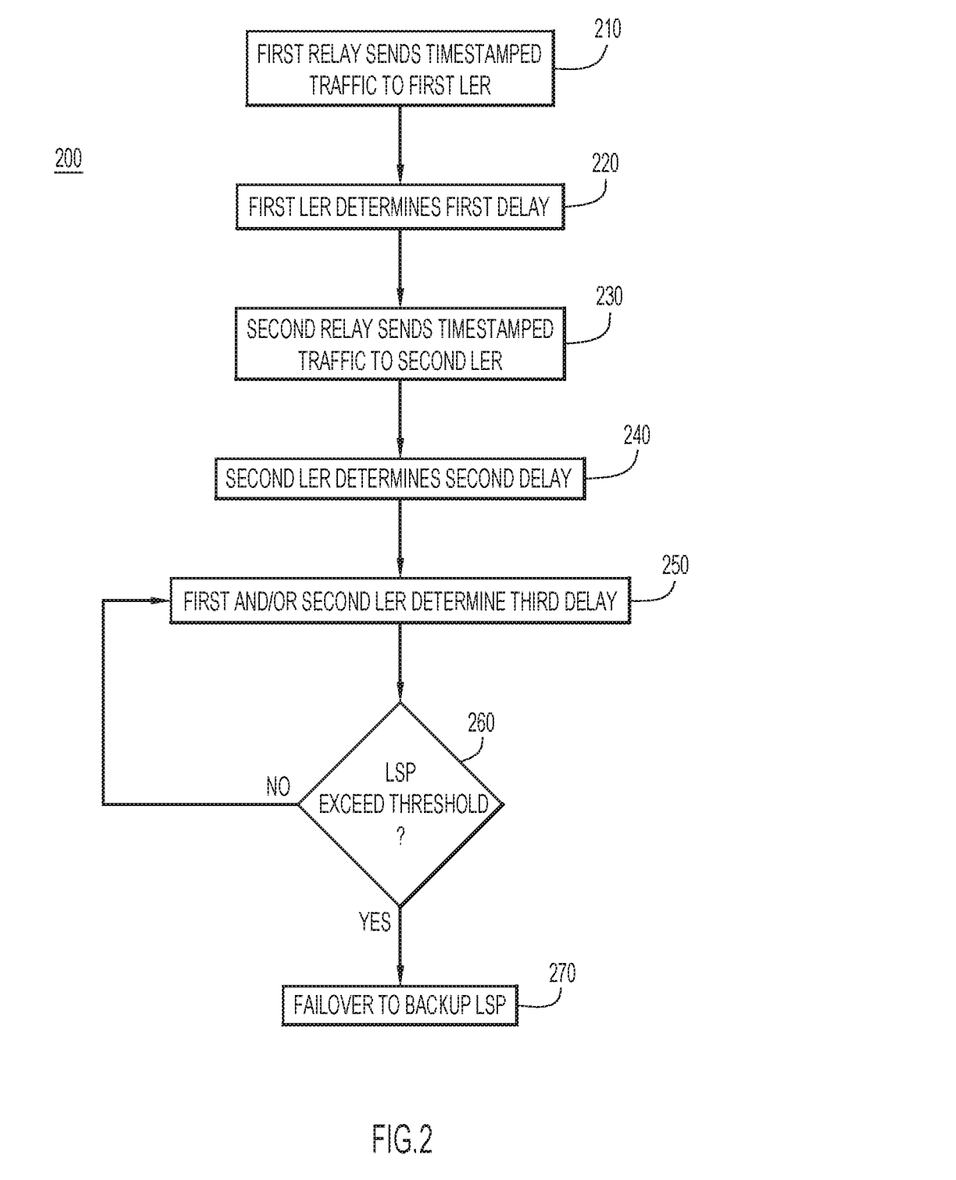
FIG. 2 is a flowchart of a method, according to an example embodiment.

Turning now to FIG. 2, and with continued reference to FIG. 1, shown is a flowchart 200 of an example method for determining whether label-switched path 125(1) complies with teleprotection requirements. Initially, relays 105(1), 105(2) and label edge routers 110(1), 110(2) may time-synchronize (e.g., via Synchronous Ethernet, Precision Time Protocol as defined in Institute of Electrical and Electronics Engineers (IEEE) 1588, etc.). In the example of FIG. 1, at 210, relay 105(1) sends timestamped traffic to label edge router 110(1) over dedicated cable 130(1). The timestamped traffic may be, for example, a Generic Object Oriented Substation Event (GOOSE) message as described in International Electrotechnical Commission (IEC) 61850. GOOSE messages may transport tripping signals between relays 105(1), 105(2), and may include timestamp information that, in accordance with the instant embodiment, enables a label edge router to determine latency information.

That is, at 220, the label edge router 110(1) determines a first delay T1. The first delay T1 is the period of time that begins when relay 105(1) generated the GOOSE message and ends when the label edge router 110(1) received the GOOSE message. In this example, label edge router 110(1) determines that the received message is a GOOSE message and examines the timestamp field of the GOOSE message. Because the label edge router 110(1) is time-synchronized with the relay 105(1), the label edge router 110(1) (compliance determination logic 135(1)) may determine the delay T1 between the relay 105(1) and the label edge router 110(1).

At 230, but not necessarily successive to 220, the relay 105(2) sends timestamped traffic (e.g., a GOOSE message) to label edge router 110(2) over dedicated cable 130(2). At 240, the label edge router 110(2) determines a second delay T2. The second delay T2 is the period of time that begins when relay 105(2) generated the GOOSE message and ends when the label edge router 110(2) received the GOOSE message. In this example, label edge router 110(2) determines that the received message is a GOOSE message and examines the timestamp field of the GOOSE message. Because the label edge router 110(2) is time-synchronized with the relay 105(2), the label edge router 110(2) (compliance determination logic 135(2)) may determine the delay T2 between the relay 105(2) and the label edge router 110(2).

At 250, label edge router 110(1) and/or label edge router 110(2) determine a third delay $T3_1$. This third delay $T3_1$ is the time required for a message (e.g., a GOOSE message) to traverse the label-switched path 125(1). In this example, and for the purposes of discussion, assume the label edge routers 110(1), 110(2) determined that the first and second delays T1, T2 were each 1 ms. Label edge router 110(2) may determine the third delay $T3_1$ by receiving a timestamped message (e.g., a GOOSE message) from relay 105(1) via label-switched path 125(1). The GOOSE message may be destined for the relay 105(2).

The label edge routers 110(1)-110(2) may determine $T3_1$ and/or $T3_2$ (i.e., delay(s) between the label edge routers 110(1)-110(2)) using techniques other than timestamped GOOSE messages. For example, the label edge routers 110(1)-110(2) may determine $T3_1$ and/or $T3_2$ using circuit emulation over the MPLS network 115, where serial communication is encapsulated into a virtual circuit over the MPLS network 115. In this example, label edge routers 110(1)-110(2) may use internal timing mechanisms to determine $T3_1$ and/or $T3_2$.

The label edge router 110(2) examines the timestamp field of the GOOSE message. Because the label edge router 110(2) is time-synchronized with the relay 105(1), the label edge router 110(2) ((compliance determination logic 135(2))) may determine the time period during which the GOOSE message traveled from the relay 105(1) to the label edge router 110(2). Further, because T1 is known (1 ms), the label edge router 110(2) may determine $T3_1$. For example, if the time period during which the GOOSE message traveled from the relay 105(1) to the label edge router 110(2) is equal to 8 ms, the label edge router 110(2) may determine that $T3_1$ (i.e., the delay attributable to the label-switched path 125(1)) is equal to 8 ms−1 ms=7 ms.

At 260, the label edge router 110(2) ((compliance determination logic 135(2))) determines whether the label-switched path 125(1) exceeds a threshold. As mentioned, there exist strict industry requirements for permissible end-to-end latency, bidirectional latency, and jitter of the label-switched path 125(1). The label edge router 110(2) may determine, for example, whether the label-switched path 125(1) exceeds an end-to-end latency threshold of 10 ms. That is, in this example, the longest permissible delay between relays 105(1) and 105(2) is 10 ms. As mentioned, T1 and T2 are both equal to 1 ms and $T3_1$ is equal to 7 ms. As such, label edge router 110(2) determines that the end-to-end latency of label-switched path 125(1) is equal to 9 ms, which is 1 ms below the end-to-end latency threshold of 10 ms. Thus, label edge router 110(2) determines that the label-switched path 125(1) does not exceed the threshold for end-to-end latency, and the flow returns to 250 to allow the label edge routers 110(1), 110(2) to continually monitor the label-switched path 125(1).

T1 and T2 are generally fixed because T1 and T2 represent delays over dedicated cables 130(1), 130(2), but $T3_1$ may change over time due to path changes through MPLS network 115. Thus, to ensure label-switched path 125(1) meets end-to-end latency requirements, the label edge routers 110(1), 110(2) may monitor the pseudowire by continually/regularly measuring $T3_1$. For example, relay 105(2) may forward another GOOSE message to relay 105(1) via label-switched path 125(1). Label edge router 110(1) may determine that $T3_1$ is now equal to 9 ms and, therefore, the end-to-end latency is equal to 11 ms. At 260, label edge router 110(1) may determine that this end-to-end latency value exceeds the end-to-end latency threshold of 10 ms.

This latency measurement may prompt failure conditions based on the specifications of the label-switched path profile. For instance, at 270, label edge router 110(1) may prompt a failover to backup label-switched path 125(2) because label-switched path 125(1) exceeds a threshold identified in the label-switched path attribute. If the transport is TP- or Flex-based, label edge router 110(1) signals label-switched path 125(1) failure over the generic associated channel (G-Ach). The G-Ach is a control channel for a circuit, and serves as a health check for Operations, Administrations, and Management (OAM) services. In this case, an alert as to the reason for the pseudowire failover may be sent via OAM. In another example, techniques described herein may validate label-switched paths 125(1) and/or 125(2) to determine whether label-switched paths 125(1) and/or 125(2) meet minimum industry requirements before sending live traffic over the label-switched paths 125(1) and/or 125(2). As mentioned, these techniques permit validation at the label edge routers 110(1) and/or 110(2), thereby avoiding the expensive test gear required in conventional arrangements.

Once label-switched path 125(1) returns to expected performance thresholds, the relays 105(1), 105(2) may resume communication over label-switched path 125(1) (i.e., failover from label-switched path 125(2) back to label-switched path 125(1)). A dampening algorithm may ensure that failovers do not rapidly occur between label-switched paths 125(1) and 125(2). In one example, failover to the backup label-switched path 125(2) only occurs as long as label-switched path 125(2) is able to meet the threshold requirements. For example, if label edge routers 110(1), 110(2) determine that label-switched path 125(2) also surpasses the threshold(s), an alarm is generated to signal that the label-switched path 125(1) exceeds a threshold and the pseudowire does not failover.

In another example, bidirectional latency may be determined. In this example, bidirectional latency is the difference in the latency of a message from relay 105(1) to relay 105(2), and the latency of a message from relay 105(2) to 105(1). At 250, the label edge routers 110(1), 110(2) have already determined that the first and second delays T1, T2 were each 1 ms. In this example, T1 and T2 are symmetric (e.g., the latency of a message transmitted from the relay 105(1) to the label edge router 110(1) is equal to the latency of a message transmitted from the label edge router 110(1) to the relay 105(1)).

In this example, label edge router 110(2) may receive a timestamped message (e.g., a GOOSE message) from relay 105(1) via label-switched path 125(1). The GOOSE message may be destined for the relay 105(2). The label edge router 110(2) examines the timestamp field of the GOOSE message. Because the label edge router 110(2) is time-synchronized with the relay 105(1), the label edge router 110(2) may determine the time period during which the GOOSE message traveled from the relay 105(1) to the label edge router 110(2). Further, because T1 is known (1 ms), the label edge router 110(2) may determine $T3_1$ (i.e., the latency of the GOOSE message from label edge router 110(1) to label edge router 110(2)). For example, if the time period during which the GOOSE message traveled from the relay 105(1) to the label edge router 110(2) is equal to 8 ms, the label edge router 110(2) may determine that $T3_1$ is equal to 8 ms−1 ms=7 ms.

Similarly, label edge router 110(1) may receive a timestamped message (e.g., a GOOSE message) from relay 105(2) via label-switched path 125(1). The GOOSE message may be destined for the relay 105(1). The label edge router 110(1) examines the timestamp field of the GOOSE message. Because the label edge router 110(1) is time-synchronized with the relay 105(2), the label edge router 110(1) may determine the time period during which the GOOSE message traveled from the relay 105(2) to the label edge router 110(1). Further, because T2 is known (1 ms), the label edge router 110(1) may determine $T3_2$ (i.e., the latency of the GOOSE message from label edge router 110(2) to label edge router 110(1)). For example, if the time period during which the GOOSE message traveled from the relay 105(2) to the label edge router 110(1) is equal to 8 ms, the label edge router 110(1) may determine that $T3_2$ is equal to 8 ms−1 ms=7 ms.

At 260, the label edge router 110(2) determines whether the label-switched path 125(1) exceeds a threshold. As mentioned, there exist strict industry requirements for permissible end-to-end latency, bidirectional latency, and jitter of the label-switched path 125(1). The label edge routers 110(1), 110(2) may determine, for example, whether the label-switched path 125(1) exceeds a bidirectional latency threshold of 1 ms. That is, in this example, greatest permissible difference in the latency of a message from relay 105(1) to relay 105(2), and the latency of a message from relay 105(2) to 105(1), is 1 ms. As mentioned, T1 and T2 are both equal to 1 ms and $T3_1$ is equal to 7 ms. As such, the latency for a message from relay 105(1) to relay 105(2) is equal to 9 ms. In addition, because $T3_2$ is also equal to 7 ms, the latency for a message from relay 105(1) to relay 105(2) is also equal to 9 ms. Thus, the bidirectional latency is equal to 9 ms−9 ms=0 ms, which is 1 ms below the bidirectional latency threshold of 1 ms. Thus, the label edge router(s) 110(1), 110(2) determine that the label-switched path 125(1) does not exceed the threshold for bidirectional latency, and the flow returns to 250 to allow the label edge routers 110(1), 110(2) to continually monitor the label-switched path 125(1).

Returning to 250, the relay 105(2) may send another GOOSE message to relay 105(1) via label-switched path 125(1). Label edge router 110(1) may determine that $T3_2$ is now equal to 9 ms and, therefore, the bidirectional latency is equal to 11 ms−9 ms=2 ms. At 260, label edge router 110(1) may determine that this exceeds the bidirectional latency threshold of 1 ms. As described above, this bidirectional latency measurement may prompt failure conditions based on the specifications of the label-switched path profile. For example, at 270, the label edge router(s) 110(1), 110(2) may prompt a failover to backup label-switched path 125(2) because label-switched path 125(1) bidirectional latency value exceeds a threshold identified in the label-switched path attribute.

Similarly, jitter may be determined using, for example, GOOSE message timestamps. If it is determined that label-switched path 125(1) is introducing unacceptable levels of jitter, label edge routers 110(1) and/or 110(2) may prompt a failover to label-switched path 125(2).

These examples enable label edge routers 110(1), 110(2) to determine whether the teleprotection environment 100 meets certain teleprotection requirements. The GOOSE messages are "naturally" generated by the relays 105(1), 105(2) as opposed to "synthetically" generated by the label edge routers 110(1), 110(2), which allows the label edge routers 110(1), 110(2) to account for the delay introduced by the dedicated cables 130(1), 130(2). A teleprotection engineer may explicitly define the label-switched paths 125(1), 125(2) since dynamic label-switched path creation is non-deterministic and therefore cannot be used. The teleprotection engineer may also program the label edge routers 110(1), 110(2) by specifying the thresholds as label-switched path attributes in a MPLS TP/TE/Flex profile. These label-switched path attributes make the MPLS network 115 aware of the teleprotection requirements for the label-switched paths 125(1), 125(2). If a legacy teleprotection scheme uses serial communications, synthetic traffic may be generated over the CESoPSN data path by the label edge routers to measure delays.

Figure 3:
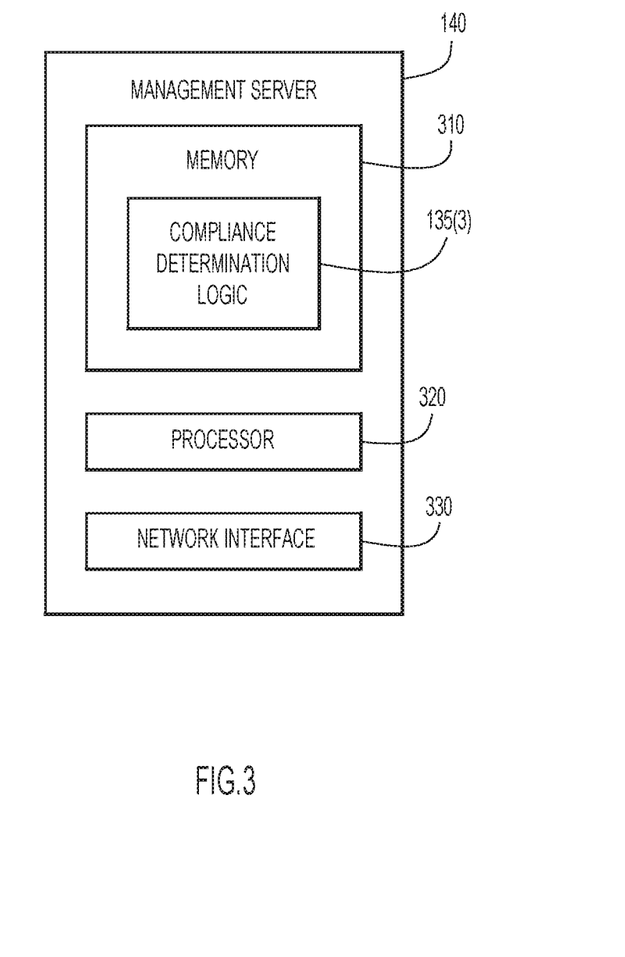
FIG. 3 is a block diagram of a management server, according to an example embodiment.

FIG. 3 is a block diagram of the management server 140 shown in FIG. 1. In this example, the management server 140 includes a memory 310, which includes compliance determination logic 135(3), one or more processors 320, and a network interface 330. The one or more processors 320 are configured to execute instructions stored in the memory 310 (e.g., compliance determination logic 135(3)). When executed by the one or more processors 320, the compliance determination logic 135(3) enables the management server 140 to perform operations described herein. The memory 310 may be read only memory (ROM), random access memory (RAM), magnetic disk storage media devices, optical storage media devices, flash memory devices, electrical, optical, or other physical/tangible memory storage devices. Thus, in general, the memory 310 may comprise one or more tangible (non-transitory) computer readable storage media (e.g., a memory device) encoded with software comprising computer executable instructions and when the software is executed (by the processor 320) it is operable to perform operations described herein.

Figure 4:
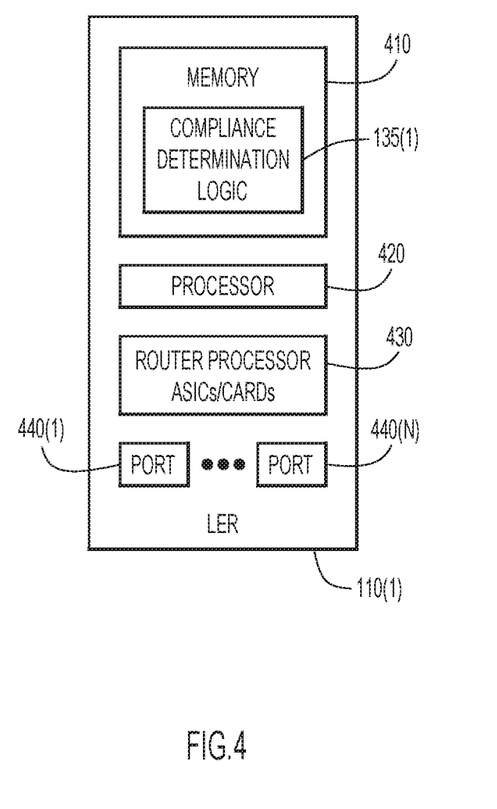
FIG. 4 is a block diagram of a label edge router, according to an example embodiment.

FIG. 4 is a block diagram of the label edge router 110(1) shown in FIG. 1. In this example, the label edge router 110(1) includes a memory 410, which includes compliance determination logic 135(1), one or more processors 420, one or more router processor application specific integrated circuits/interface cards 430, and network ports 440(1)-440(N). The one or more processors 420 are configured to execute instructions stored in the memory 410 (e.g., compliance determination logic 135(1)). When executed by the one or more processors 420, the compliance determination logic 135(1) enables the label edge router 110(1) to perform operations described herein. The router processor application specific integrated circuits/interface cards 430 and network ports 440(1)-440(N) permit the label edge router 110(1) to communicate with other network devices (e.g., core routers 120(1)-120(2)).

The memory 410 may be read only memory (ROM), random access memory (RAM), magnetic disk storage media devices, optical storage media devices, flash memory devices, electrical, optical, or other physical/tangible memory storage devices. Thus, in general, the memory 410 may comprise one or more tangible (non-transitory) computer readable storage media (e.g., a memory device) encoded with software comprising computer executable instructions and when the software is executed (by the processor 420) it is operable to perform operations described herein.

Figure 5:
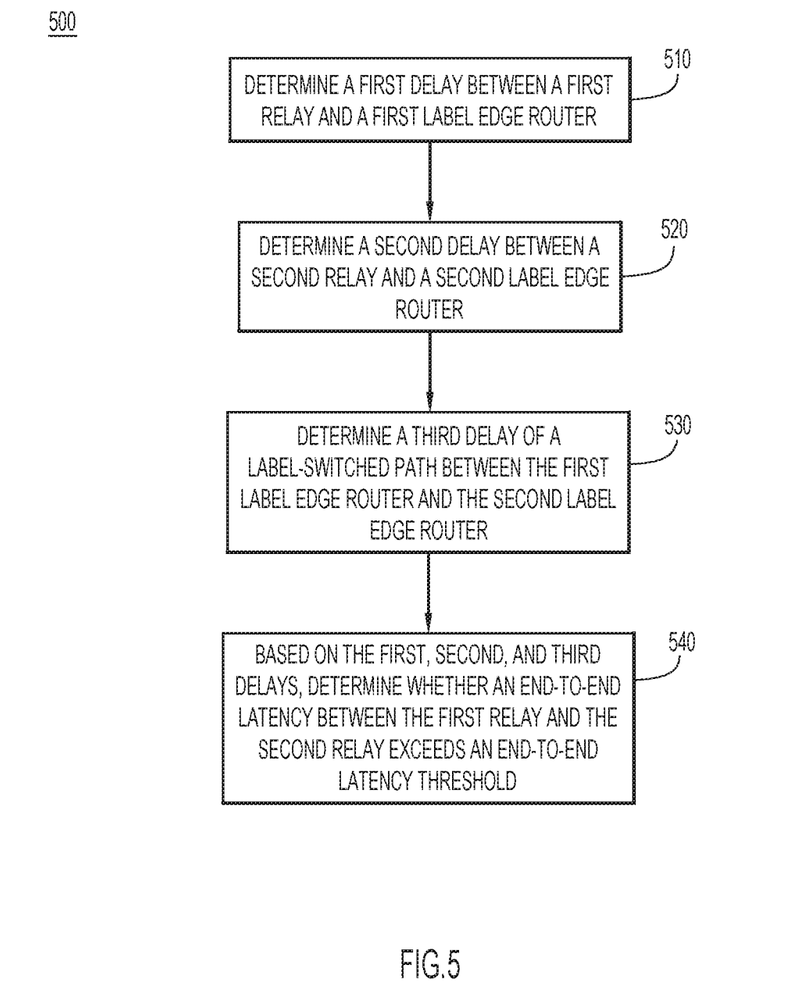
FIG. 5 is a flowchart of a generalized method in accordance with examples presented herein.

FIG. 5 is a flowchart 500 of a method in accordance with examples presented herein. At 510, a first delay between a first relay and a first label edge router is determined. At 520, a second delay between a second relay and a second label edge router is determined. At 530, a third delay of a label-switched path between the first label edge router and the second label edge router is determined. At 540, based on the first, second, and third delays, it is determined whether an end-to-end latency between the first relay and the second relay exceeds an end-to-end latency threshold.

As described herein, the communication infrastructure is application aware in the sense that critical thresholds of teleprotection are used to configure and administer the network. The network infrastructure also provides critical data and conditions to connected applications. This makes configuration simpler and less error-prone. These techniques may ensure that the network is capable of supporting teleprotection via a label edge router, and provide the capability to failover to a backup label-switched path in the event that the primary label-switched path no longer meets minimal conditions for the relays. In addition, the network uses the actual time of the network, as opposed to an external reference time.

In one form, a method is provided. The method comprises: determining a first delay between a first relay and a first label edge router; determining a second delay between a second relay and a second label edge router; determining a third delay of a label-switched path between the first label edge router and the second label edge router; and based on the first, second, and third delays, determining whether an end-to-end latency between the first relay and the second relay exceeds an end-to-end latency threshold.

In another form, a system is provided. The system comprises: a first relay; a first label edge router; a second relay; and a second label edge router, wherein the system is configured to: determine a first delay between the first relay and the first label edge router; determine a second delay between the second relay and the second label edge router; determine a third delay of a label-switched path between the first label edge router and the second label edge router; and based on the first, second, and third delays, determine whether an end-to-end latency between the first relay and the second relay exceeds an end-to-end latency threshold.

In another form, one or more non-transitory computer readable storage media are provided. The non-transitory computer readable storage media are encoded with instructions that, when executed by one or more processors, cause the processors to: determine a first delay between a first relay and a first label edge router; determine a second delay between a second relay and a second label edge router; determine a third delay of a label-switched path between the first label edge router and the second label edge router; and based on the first, second, and third delays, determine whether an end-to-end latency between the first relay and the second relay exceeds an end-to-end latency threshold.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
determining a first delay between a first relay and a first label edge router;
determining a second delay between a second relay and a second label edge router;
determining a third delay of a label-switched path between the first label edge router and the second label edge router; and
based on the first, second, and third delays, determining whether an end-to-end latency between the first relay and the second relay exceeds an end-to-end latency threshold.

2. The method of claim 1, wherein:
determining the first delay includes determining the first delay based on a first timestamp of a first Generic Object Oriented Substation Event (GOOSE) message; and
determining the second delay includes determining the second delay based on a second timestamp of a second GOOSE message.

3. The method of claim 1, further comprising:
if it is determined that the end-to-end latency exceeds the end-to-end latency threshold, initiating a failover to a backup label-switched path between the first label edge router and the second label edge router.

4. The method of claim 3, further comprising:
determining a fourth delay of the backup label-switched path between the first label edge router and the second label edge router; and
based on the first, second, and fourth delays, determining that another end-to-end latency between the first relay and the second relay does not exceed the end-to-end latency threshold.

5. The method of claim 3, further comprising:
determining that the end-to-end latency no longer exceeds the end-to-end latency threshold; and
initiating another failover from the backup label-switched path to the label-switched path.

6. The method of claim 1, wherein the first and second delays are fixed, and wherein the third delay varies according to the label-switched path.

7. The method of claim 6, further comprising:
at a time subsequent to determining the third delay, determining a fourth delay that is different from the third delay; and
based on the first, second, and fourth delays, determining whether the end-to-end latency exceeds the end-to-end latency threshold.

8. The method of claim 1, further comprising:
time synchronizing the first relay, the second relay, the first label edge router, and the second label edge router.

9. The method of claim 1, further comprising, based on the first, second, and third delays, determining bidirectional latency and/or jitter.

10. The method of claim 1, wherein:
determining the first delay, the second delay, the third delay, and/or the end-to-end latency includes determining the first delay, the second delay, the third delay, and/or the end-to-end latency at the first and/or second label edge routers.

11. The method of claim 1, further comprising:
based on the first, second, and third delays, determining whether a bidirectional latency between the first relay and the second relay exceeds a bidirectional latency threshold.

12. A system comprising:
a first relay;
a first label edge router;
a second relay; and
a second label edge router, wherein the system is configured to:
determine a first delay between the first relay and the first label edge router;
determine a second delay between the second relay and the second label edge router;
determine a third delay of a label-switched path between the first label edge router and the second label edge router; and
based on the first, second, and third delays, determine whether an end-to-end latency between the first relay and the second relay exceeds an end-to-end latency threshold.

13. The system of claim 12, wherein the system is configured to:
determine the first delay based on a first timestamp of a first Generic Object Oriented Substation Event (GOOSE) message; and
determine the second delay based on a second timestamp of a second GOOSE message.

14. The system of claim 12, wherein the system is further configured to:
if it is determined that the end-to-end latency exceeds the end-to-end latency threshold, initiate a failover to a backup label-switched path between the first label edge router and the second label edge router.

15. The system of claim 12, wherein:
the first label edge router and/or the second label edge router is configured to determine the first delay, the second delay, the third delay, and/or the end-to-end latency.

16. The system of claim 12, further comprising a management server in communication with the first label edge router and the second label edge router, wherein the management server is configured to determine the first delay, the second delay, the third delay, and/or the end-to-end latency.

17. One or more non-transitory computer readable storage media encoded with instructions that, when executed by one or more processors, cause the one or more processors to:
determine a first delay between a first relay and a first label edge router;
determine a second delay between a second relay and a second label edge router;
determine a third delay of a label-switched path between the first label edge router and the second label edge router; and
based on the first, second, and third delays, determine an end-to-end latency between the first relay and the second relay exceeds an end-to-end latency threshold.

18. The one or more non-transitory computer readable storage media of claim 17, wherein the instructions that cause the one or more processors to:
determine the first delay include instructions that cause the one or more processors to determine the first delay based on a first timestamp of a first Generic Object Oriented Substation Event (GOOSE) message; and
determine the second delay include instructions that cause the one or more processors to determine the second delay based on a second timestamp of a second GOOSE message.

19. The one or more non-transitory computer readable storage media of claim 17, wherein the instructions further cause the one or more processors to:
if it is determined that the end-to-end latency exceeds the end-to-end latency threshold, initiate a failover to a backup label-switched path between the first label edge router and the second label edge router.

20. The one or more non-transitory computer readable storage media of claim 17, wherein the first and second delays are fixed, and wherein the third delay varies according to the label-switched path.

\* \* \* \* \*